United States Patent [19]
Gross et al.

[11] Patent Number: 6,018,575
[45] Date of Patent: Jan. 25, 2000

[54] DIRECT DISTANCE DIALING (DDD) ACCESS TO A COMMUNICATIONS SERVICES PLATFORM

[75] Inventors: Karen A. Gross, Cedar Rapids, Iowa; Eddie L. Pickeral, Plano, Tex.; Thomas W. Lear, Colorado Springs, Colo.

[73] Assignee: MCI WorldCom, Miss.

[21] Appl. No.: 08/925,371

[22] Filed: Sep. 8, 1997

[51] Int. Cl.[7] .................................................. H04M 3/42
[52] U.S. Cl. ........................... 379/220; 379/207; 379/230
[58] Field of Search .................................. 379/207, 219, 379/220, 221, 229, 230, 242, 114, 115, 113, 121

[56] References Cited

U.S. PATENT DOCUMENTS

| | | | |
|---|---|---|---|
| 3,506,791 | 4/1970 | Halaby | 179/41 |
| 3,676,603 | 7/1972 | Budrys | 179/18 BF |
| 3,854,013 | 12/1974 | Altenburger et al. | 179/18 BE |
| 3,959,600 | 5/1976 | Sousa | 179/18 BE |
| 3,997,731 | 12/1976 | Wilmot et al. | 179/18 B |
| 4,054,756 | 10/1977 | Comella et al. | 179/18 B |
| 4,065,642 | 12/1977 | McClure | 179/18 B |
| 4,072,824 | 2/1978 | Phillips | 179/18 B |
| 4,086,438 | 4/1978 | Kahn et al. | 179/18 BE |
| 4,266,098 | 5/1981 | Novak | 179/5.5 |
| 4,277,649 | 7/1981 | Sheinbein | 179/18 B |
| 4,278,844 | 7/1981 | Jones | 179/18 B |
| 4,313,035 | 1/1982 | Jordan et al. | 179/18 BE |
| 4,369,339 | 1/1983 | Castro et al. | 179/84 C |
| 4,420,656 | 12/1983 | Freeman | 179/6.04 |
| 4,475,009 | 10/1984 | Rais et al. | 179/2 A |
| 4,488,005 | 12/1984 | Frantz | 179/18 B |
| 4,555,594 | 11/1985 | Friedes et al. | 379/207 |
| 4,565,903 | 1/1986 | Riley | 379/201 |
| 4,577,066 | 3/1986 | Bimonte et al. | 379/243 |
| 4,578,540 | 3/1986 | Borg et al. | 179/2 A |
| 4,591,664 | 5/1986 | Freeman | 179/6.06 |
| 4,611,094 | 9/1986 | Asmuth et al. | 179/7.1 TP |
| 4,611,096 | 9/1986 | Asmuth et al. | 179/18 B |
| 4,625,081 | 11/1986 | Lotito et al. | 379/88 |
| 4,670,628 | 6/1987 | Boratgis et al. | 379/69 |

(List continued on next page.)

FOREIGN PATENT DOCUMENTS

| | | |
|---|---|---|
| 0152908 | 8/1985 | European Pat. Off. . |
| 0216381 | 4/1987 | European Pat. Off. . |
| 0216515 | 4/1987 | European Pat. Off. . |
| 0330441 | 8/1989 | European Pat. Off. . |
| 2198910 | 6/1988 | United Kingdom . |

OTHER PUBLICATIONS

Kopec et al., "Electronic Business Telephone," *GTE Automatic Electric Jouranl,* Mar. 1981, pp. 34–40.

An et al., "Direct Dialing of Credit Card Calls," 1981 *International Conference on Communications,* Denver, Colorado, Jun. 1981, pp. 44.1.1–44.1.5.

Product Reference Guide: "SR 1000 PBX Digital Private Branch Exchange," Solid State Systems Inc., Nov. 1987.

Perkins, Ed, How to Get BIG Discounts on Airfares, Hotels, Car Rentals, and More, *Consumer Reports 1992 Travel Buying Guide,* Consumer Reports Books, Yonkers, NY 1992, pp. 293–299.

"Full–Time Fax Forwarding," *Macworld,* May 1993, p. 81.

Rosenbaum, Ron, "Secrets of the Little Blue Box," *Esquire Magazine,* Oct. 1971, p. 116.

User's Guide for the LOGOS ES1 by Logotronix, Boulder, Colorado, undated.

*Primary Examiner*—Scott Wolinsky

[57] ABSTRACT

Direct Distance Dialing (DDD) access is provided for a communications services platform. A caller may dial a local DDD number or a long distance DDD number to access the communications services platform. A platform may provide a plurality of different communications services, including voicemail services, paging services, automatic routing services, and facsimile messaging services. Expenses associated with servicing the call are partitioned between a caller and a subscriber of the communications services platform in an intuitive and reasonable fashion.

3 Claims, 12 Drawing Sheets

U.S. PATENT DOCUMENTS

| | | | |
|---|---|---|---|
| 4,674,115 | 6/1987 | Kaleita et al. | 379/201 |
| 4,737,976 | 4/1988 | Borth et al. | 379/58 |
| 4,747,124 | 5/1988 | Ladd | 379/67 |
| 4,752,951 | 6/1988 | Konneker | 379/211 |
| 4,783,796 | 11/1988 | Ladd | 379/67 |
| 4,814,763 | 3/1989 | Nelson et al. | 340/825.44 |
| 4,821,308 | 4/1989 | Hashimoto | 379/57 |
| 4,823,123 | 4/1989 | Siwiak | 340/825.44 |
| 4,847,890 | 7/1989 | Solomon et al. | 379/6.7 |
| 4,866,763 | 9/1989 | Cooper et al. | 379/201 |
| 4,875,038 | 10/1989 | Siwiak et al. | 340/825.44 |
| 4,878,240 | 10/1989 | Lin et al. | 379/67 |
| 4,893,329 | 1/1990 | O'Brien | 379/88 |
| 4,893,335 | 1/1990 | Fuller et al. | 379/200 |
| 4,899,373 | 2/1990 | Lee et al. | 379/207 |
| 4,920,562 | 4/1990 | Hird et al. | 379/132 |
| 4,926,462 | 5/1990 | Ladd et al. | 379/67 |
| 4,932,042 | 6/1990 | Baral et al. | 379/67 |
| 4,933,965 | 6/1990 | Hird et al. | 379/112 |
| 4,935,956 | 6/1990 | Hellwarth et al. | 379/112 |
| 4,942,598 | 7/1990 | Davis | 379/57 |
| 4,955,047 | 9/1990 | Morganstein et al. | 379/112 |
| 5,020,095 | 5/1991 | Morganstein et al. | 379/67 |
| 5,027,384 | 6/1991 | Morganstein | 379/67 |
| 5,029,196 | 7/1991 | Morganstein | 379/67 |
| 5,063,588 | 11/1991 | Patsiokas et al. | 379/57 |
| 5,090,051 | 2/1992 | Muppidi et al. | 379/61 |
| 5,151,929 | 9/1992 | Wolf | 379/57 |
| 5,193,110 | 3/1993 | Jones et al. | 379/94 |
| 5,199,062 | 3/1993 | Von Meister et al. | 379/67 |
| 5,222,120 | 6/1993 | McLeod et al. | 379/88 |
| 5,222,125 | 6/1993 | Creswell et al. | 379/67 |
| 5,260,986 | 11/1993 | Pershan | 379/57 |
| 5,276,731 | 1/1994 | Arbel et al. | 379/88 |
| 5,307,399 | 4/1994 | Dai et al. | 379/57 |
| 5,311,585 | 5/1994 | Armstrong et al. | 379/220 |
| 5,315,636 | 5/1994 | Patel | 379/58 |
| 5,375,161 | 12/1994 | Fuller et al. | 379/57 |
| 5,384,831 | 1/1995 | Creswell et al. | 379/67 |
| 5,394,463 | 2/1995 | Fischell et al. | 379/201 |
| 5,406,620 | 4/1995 | Pei | 379/221 |
| 5,450,479 | 9/1995 | Alesio et al. | 379/144 |
| 5,550,912 | 8/1996 | Akinpelu et al. | 379/221 |
| 5,570,417 | 10/1996 | Byers | 379/115 |
| 5,572,579 | 11/1996 | Orriss et al. | 379/211 |
| 5,574,781 | 11/1996 | Blaze | 379/220 |
| 5,586,177 | 12/1996 | Farris et al. | 379/220 |
| 5,588,037 | 12/1996 | Fuller et al. | 379/57 |
| 5,621,787 | 4/1997 | McKoy et al. | 379/114 |
| 5,689,555 | 11/1997 | Sonnenberg | 379/207 |
| 5,761,290 | 6/1998 | Farris et al. | 379/207 |
| 5,809,121 | 9/1998 | Elliott et al. | 379/116 |
| 5,812,639 | 9/1998 | Bartholomew et al. | 379/207 |
| 5,818,919 | 10/1998 | Berberich, Jr. et al. | 379/207 |

6,018,575

DIRECT DISTANCE DIALING (DDD) ACCESS TO A COMMUNICATIONS SERVICES PLATFORM

TECHNICAL FIELD

The present invention relates generally to telecommunications systems and, more particularly, to a system that provides Direct Distance Dialing (DDD) access to a communications services platform.

BACKGROUND OF THE INVENTION

A number of different communications services are available to a customer, including local telephone service, long distance telephone service, automatic routing service, cellular telephone services, voice mail messaging service, facsimile messaging service, paging service, and the like. Unfortunately, each such service requires a unique telephone number. As a result, the customer must manage the multiple telephone numbers and not confuse the mapping of telephone numbers to services. This confusion is enhanced by each of the services being separately billed such that a customer receives separate billing statements for each of the services. Unfortunately, accessing communications services like those described above are not generally available by single number DDD access.

SUMMARY OF THE INVENTION

The present invention provides direct distance dialing (DDD) access to a platform that provides multiple communications services. The platform may provide, for example, voice mail services, paging services, automatic routing services, facsimile messaging services and other services. The billing for calls that are handled by the platform is shared between the caller and the subscriber. The caller will be charged as if the caller attempted to place a call to the subscriber at the subscriber's home location (i.e., at the location dialed by the caller). The other charges associated with the call will be assessed to the subscriber of services that are provided by the platform.

In accordance with a first aspect of the present invention, a method is practiced in a telecommunications network that has a switch for routing calls and a platform that provides multiple communications services on behalf of a subscriber. A call is received at the switch from a caller that was initiated as a DDD call by dialing a DDD number. The switch performs a translation of the DDD number to a value for accessing the platform. The call is routed from the switch to the platform using the translated value.

In accordance with another aspect of the present invention, the telecommunications network includes a platform for providing multiple communications services on behalf of the subscriber. The telecommunications network also includes a selected switch that receives a call from a caller who dials a DDD telephone number to place a call to the subscriber. The switch includes a translator for translating the DDD telephone number to a translated value for use in routing the call. The telecommunications network also includes routing switching for using the translated value to route the call to the platform.

In accordance with a further aspect of the present invention, a method is practiced in a telecommunications network that has a platform for providing multiple communications services on behalf of a subscriber. The method is concerned with billing a call that is initiated from a caller to the subscriber but that is serviced by the platform. The caller is charged for calling the subscriber, whereas the servicing performed by the platform is charged to the subscriber.

BRIEF DESCRIPTION OF THE DRAWINGS

An exemplary embodiment of the present invention will be described relative to the following figures.

DETAILED DESCRIPTION OF THE INVENTION

The exemplary embodiment of the present invention provides Direct Distance Dialing (DDD) access to a communications services platform. The communications services platform provides multiple communications services, which may include automatic routing services, voicemail services, facsimile services, paging services and other services. The platform may be accessible not only by DDD access, but also may be accessible by toll-free 800/888 numbers, virtual private network (VPN) number accessed and by remote computer access, such as by intranet, extranet, or Internet.

The exemplary embodiment of the present invention provides consolidated billing to a subscriber for the multiple communications services that are provided by the platform. The exemplary embodiment allows billing to the caller for non-toll-free access to the platform. As such, the subscriber only pays for the portion of the call that is extended from the original DDD destination to the final destination. The caller pays for the portion of the call from the point of call origination to the original DDD destination. The caller will only pay for the call that they know they are making but is still able to reach the subscriber at another destination.

DDD is the standard method for placing long distance calls to North American destinations. A DDD telephone number is typically ten digits for long distance calls and seven digits for local calls. The exemplary embodiment of the present invention allows a DDD number to be dialed to access the platform in a fashion that is indistinguishable from dialing a DDD number to place a call anywhere else. The exemplary embodiment of the present invention also allows international DDD dialing.

A "platform" refers to a computer, computing resources or other mechanisms that provide communications services, such as voice mail services, electronic mail services, facsimile services, paging services, call screening services, and automatic routing services. A "subscriber" refers to a person for whom that platform provides services. A "caller" refers to a person or other entity that initiates a call to the platform to attempt to reach the subscriber.

Figure 1:
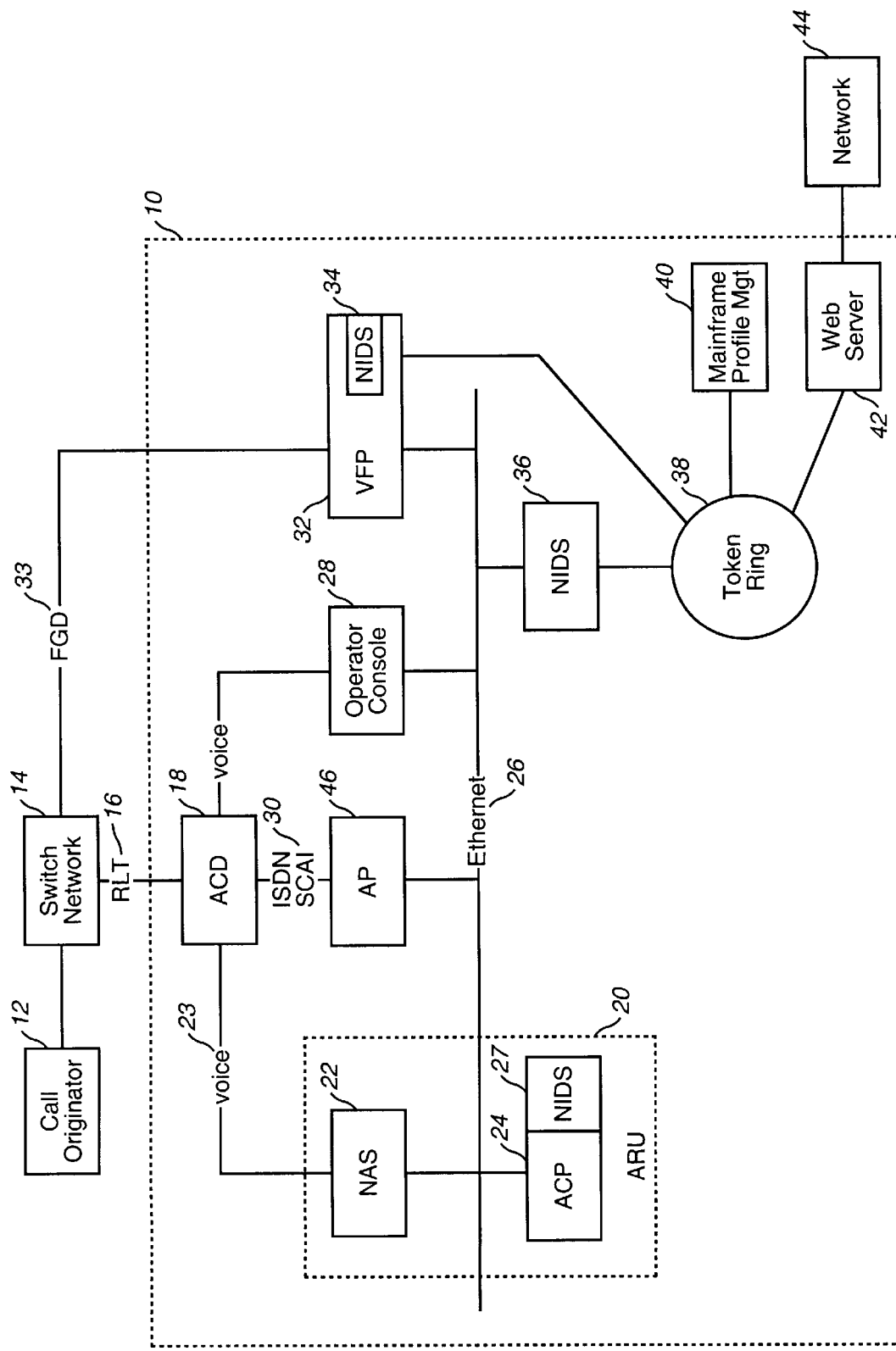
FIG. 1 depicts a communications services platform that is suitable for practicing the exemplary embodiment of the present invention.

FIG. 1 is a block diagram that illustrates a system architecture for the communications services platform. This system architecture is part of a larger telecommunications network as will be described in more detail below. The single telephone number that provides access to the subscriber may be accessed both by the subscriber and by a caller that is attempting to reach the subscriber. The platform 10 includes an automated call distributor (ACD) 18 for performing switching functions and providing access to the platform. The ACD 18 routes incoming calls to components within the platform to ensure that the calls are properly handled. The ACD 18 may be a conventional digital matrix switch that includes programs for performing call queuing and distribution. A suitable switch for the ACD 18 is the Northern Telecom DMS-100.

The platform 10 includes an application processor (AP) 46 that assists the ACD 18. The AP 46 may be a dedicated computer system that provides intelligent application processing for the ACD 18. The AP performs functionality that may be off-loaded from the ACD 18 to enable the ACD to focus on performing the switching and queuing functions required by the platform. The AP 46 is coupled to the ACD 18 via an ISDN implementation of a switch/computer application interface (SCAI) link 30.

The platform 10 includes an automated response unit (ARU) 20 that provides voice response and menu routing functions to a caller. The ARU 20 facilitates caller input via selection of dual-tone multi-frequency (DTMF) digits, such as by pressing keys on the telephone keypad. The ARU 20 may provide various automated menus through which the caller may navigate to reach a desired service. The ARU 20 includes a network audio server (NAS) 22 that is a server computer with a voice telephony interface to the ACD 18. The NAS 22 is linked to the ACD 18 via multiple voice trunks 23 and, in general, provides an audio interface to a caller. ARU 20 includes an automated call processor (ACP) 24. The ACP 24 provides intelligent call processing functions for the ARU 20. The ARU 20 handles all initial inbound calls for the platform 10. The ARU 20, the AP 46 and other components may be interconnected via a local area network (LAN) 26, such as an Ethernet network. The ACP 24 operates by executing scripts that take callers through a series of menus. The ACP 24 accepts caller input, makes decisions based upon the caller input, and performs actions, such as a transfer of calls to destinations, in order to provide services. The ACP 24 prompts the NAS 22 to play prompts to callers, to gather DTMF digit input, to play various recorded messages and to direct the caller to other destinations. A high-grade mid-range computer, such as the IBMRS/6000 or an alpha-based server may be used to implement the ACP 24.

Scripts executed by the ACP 24 determine what communication services are provided to a caller, and the ACP provides those services by commanding the NAS 22 to transfer calls to the appropriate service providers. The scripts executed by the ACP 24 may be customized for a subscriber by using a subscriber profile's input data. The subscriber profile is stored for use by the platform, and specifies what services are available to a subscriber.

The platform 10 may include one or more operator consoles at which operators are stationed. The operator consoles 28 are specialized workstations that may include telephone facilities, such as a head set and a telephone key pad. The operators at the operator consoles 28 may perform much of the same functionality that is provided by the ARU 20.

The platform 10 may include a voice mail/fax mail platform (VFP) 32 for collecting, storing and managing voice mail messages and facsimile messages. The telephone switching network 14 is connected to the VFP 32 via Feature Group D (FGD) trunks 33. Calls that require voice mail messages or facsimile messages are transferred to the VFP 32 from the ARU 20 with the assistance of the ACD 18 and the switching network 14.

The platform 10 may include multiple network implementation distribution servers (NIDS) 27, 34, and 36. Each of these NIDS 27, 34, and 36 may be implemented as a separate computer system. They may be redundant and each may serve the role of storing database information, including subscriber profiles. In general, the ACP 24 submits database queries to the NIDS 27, 34, and 36 to obtain data or subscriber profiles. Subscriber profiles may be used to determine what scripts to play to a caller and to determine what destination telephone numbers and mailbox identifiers are to be used. The NIDS 27, 34, and 36 may also be interconnected via a token ring LAN 38. This LAN 38 may be used for updates that are made to subscriber profiles and keep the databases stored on the various NIDS 27, 34, and 36 consistent with a centralized profile database that is maintained by the mainframe profile management system 40. This system 40 is implemented on the dedicated mainframe or other suitable computer system.

The platform 10 may include a web server 42 that is connected to the token ring LAN 38 to provide a web site for subscriber access over a network 44, such as an intranet, the Internet, or an extranet. The web server 42 is described in more detail in copending application entitled INTERNET-BASED SUBSCRIBER PROFILE MANAGEMENT OF A COMMUNICATIONS SYSTEM U.S. Ser. No. 08/925,370, filed Sep. 8, 1997 (abandoned) which is assigned to a common assignee with the present application and which is explicitly incorporated by reference herein.

The call originator 12 depicted in FIG. 1 represents the origination of a call to the platform 10. This call may be from a subscriber or a caller that is seeking to reach the telephone number that is assigned to the subscriber. The call may also originate from a non-human source, such as a facsimile machine or computer. The call reaches a switch network 14 of the service provider in any of a number of different ways, including local exchange carrier, private line, dedicated access line or international carrier. The switch network 14 routes the call to the ACD 18 via a release link trunk (RLT) 16. The RLT 16 is a voice trunk that may be released from a call when the extended back to the switch network 14 by the ACD 18.

The platform is described in more detail in copending application entitled "SINGLE TELEPHONE NUMBER ACCESS TO MULTIPLE COMMUNICATION SERVICES," which is assigned to a common assignee and which is explicitly incorporated by reference herein.

Those skilled in the art will appreciate that other platforms may be utilized to practice the present invention. The platform depicted in FIG. 1 is intended to merely illustrative.

Figure 2:
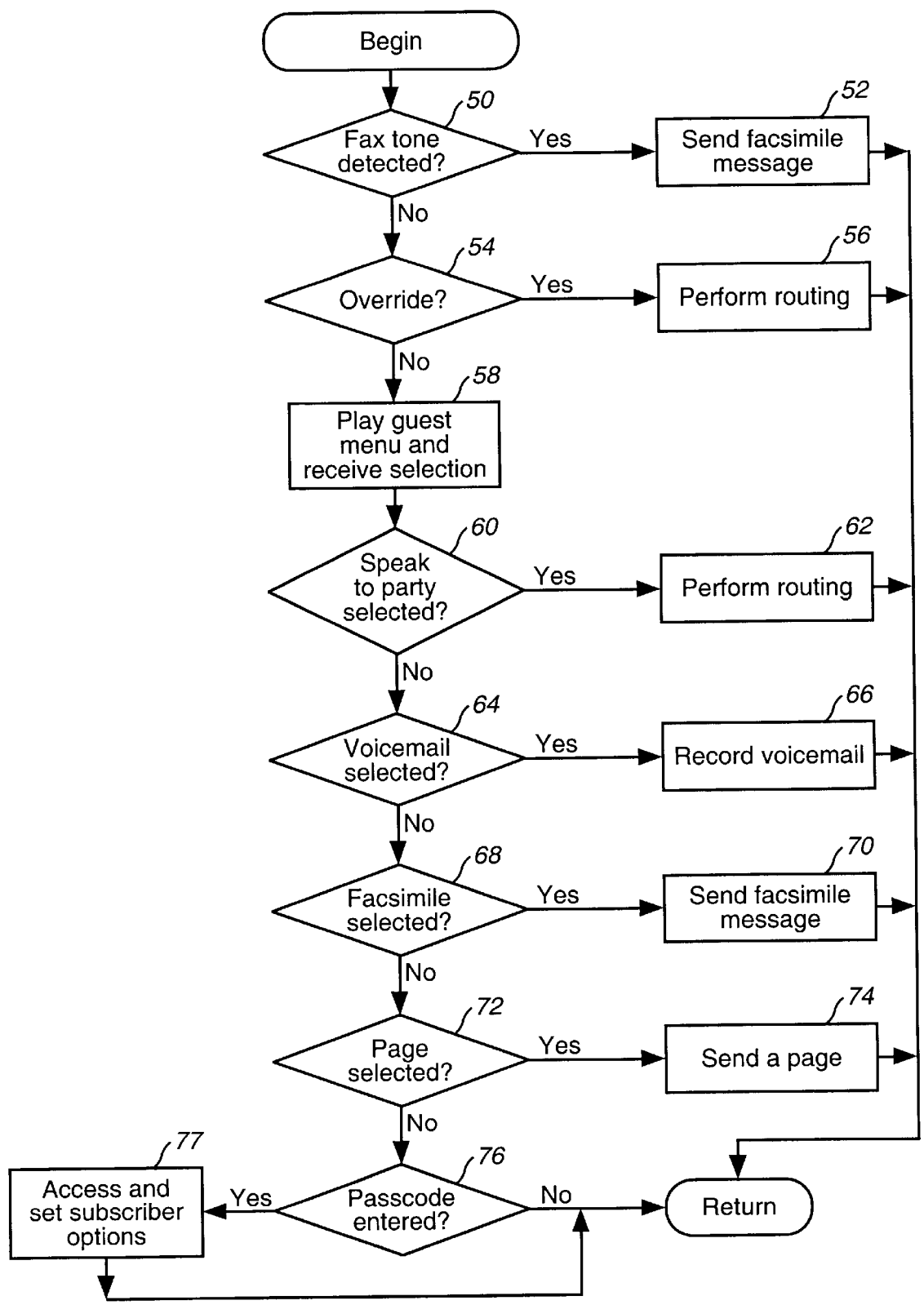
FIG. 2 is a flowchart illustrating the steps that are performed by the communications services platform in servicing a call.

FIG. 2 shows a flow chart of the steps that are performed in processing a call that is received by the platform 10. Initially, it is determined whether a facsimile tone is detected so as to determine whether the call initiated from the facsimile source, such as a facsimile machine or a computer system (step 50 in FIG. 2). In such a case, the platform enables a facsimile connection to be realized so that a facsimile message may be sent to the subscriber from the caller (step 52 in FIG. 2). The platform allows an override feature to be set by the subscriber so that a guest caller does not have the option of choosing what communications services are to be applied by the platform. Instead, the override dictates how the call will be routed. Thus, in step 54, it is determined whether the override is set, and if the override is set, the appropriate routing is performed (step 56 in FIG. 2). If the override is not set, a guest menu is played that allows the user to choose a number of different options and the platform receives user selection, such as by the user pressing a key associated with an option (step 58 in FIG. 2). If the caller chooses to speak to the party (step 60 in FIG. 2), the appropriate routing is performed to connect the caller with the party (step 62 in FIG. 2). If the caller chooses to leave a voice mail message (see step 64 in FIG. 2), a voice mail is recorded and stored in the subscriber's voice mail box (step 66 in FIG. 2). The caller may also choose to send a facsimile message (see step 68 in FIG. 2). In such a case, the platform receives the facsimile message and stores it for the subscriber (step 70 in FIG. 2). The caller may additionally choose to send a page to the subscriber (see step 72 in FIG. 2). In such a case, the page to the subscriber from the caller is initiated (step 74 in FIG. 2). Lastly, a subscriber may gain access to a number of subscriber options by entering a pass code (see steps 76 and 77 in FIG. 2). Subscriber options allow the subscriber to configure communications services that are available via the platform.

Figure 3:
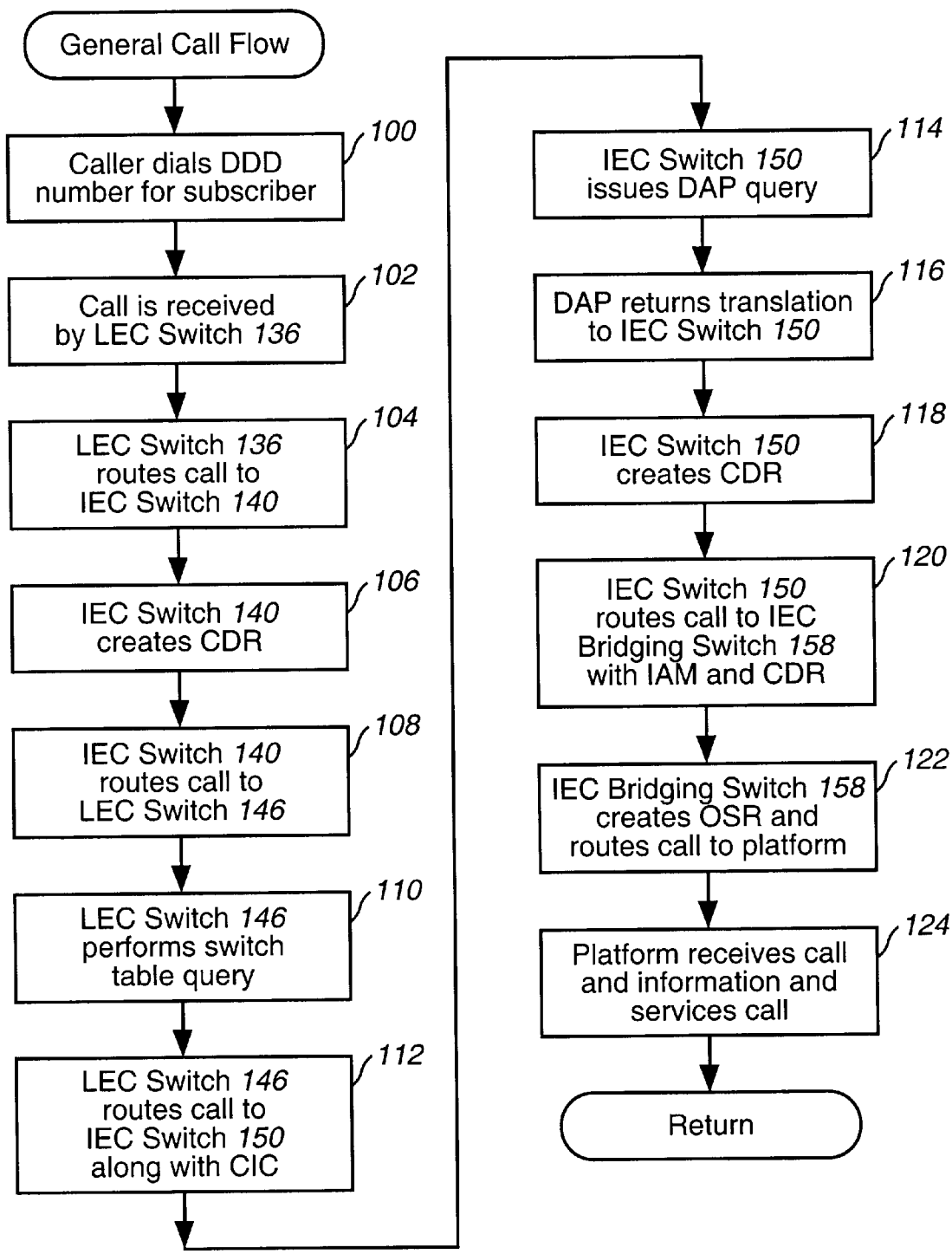
FIG. 3 is a flowchart illustrating the steps performed in the general call flow for the illustrative embodiment of the present invention.

The discussion below will now focus on the details of providing DDD access to the platform in the exemplary embodiment of the present invention. FIG. 3 provides a flowchart of the steps that are provided during the call flow for a DDD access to platform 10. FIG. 3 will be described in conjunction with FIG. 4 which depicts components that are involved in processing the call. Initially, a caller 134 dials a DDD number for a subscriber from a location within a local exchange carrier (LEC) to attempt to access the subscriber (step 100 in FIG. 3). The call passes to LEC switch 136 (step 102 in FIG. 3) that resides within calling area 130 (see arrow 135 in FIG. 4). The LEC switch 136 routes the call to the inter-exchange carrier (IEC) that is selected by the caller 134 so that the call is routed to IEC switch 140 (step 104 in FIG. 3; see arrow 138 in FIG. 4).

The IEC switch 140 creates a call detail record (CDR) that is used to bill the caller for the non-toll-free access portion of the call to the platform 10 (step 106 in FIG. 3). The caller is billed for a standard dial-one long distance call from calling area 130 to calling area 132 in which the subscriber's home 148 is located. The amount that the caller is charged is determined by the caller's selected IEC. When the caller places the call, the caller is aware of the billable nature of the call, based upon the DDD number that the caller dials. One of the benefits of the exemplary embodiment of the present invention is that it enables the caller to reach the subscriber in an unknown calling area 180 while still being billed for a long distance call to the calling area 132 that the DDD number reflects. As will be described in more detail below, the extension is billed to the subscriber's platform account.

Figure 4:
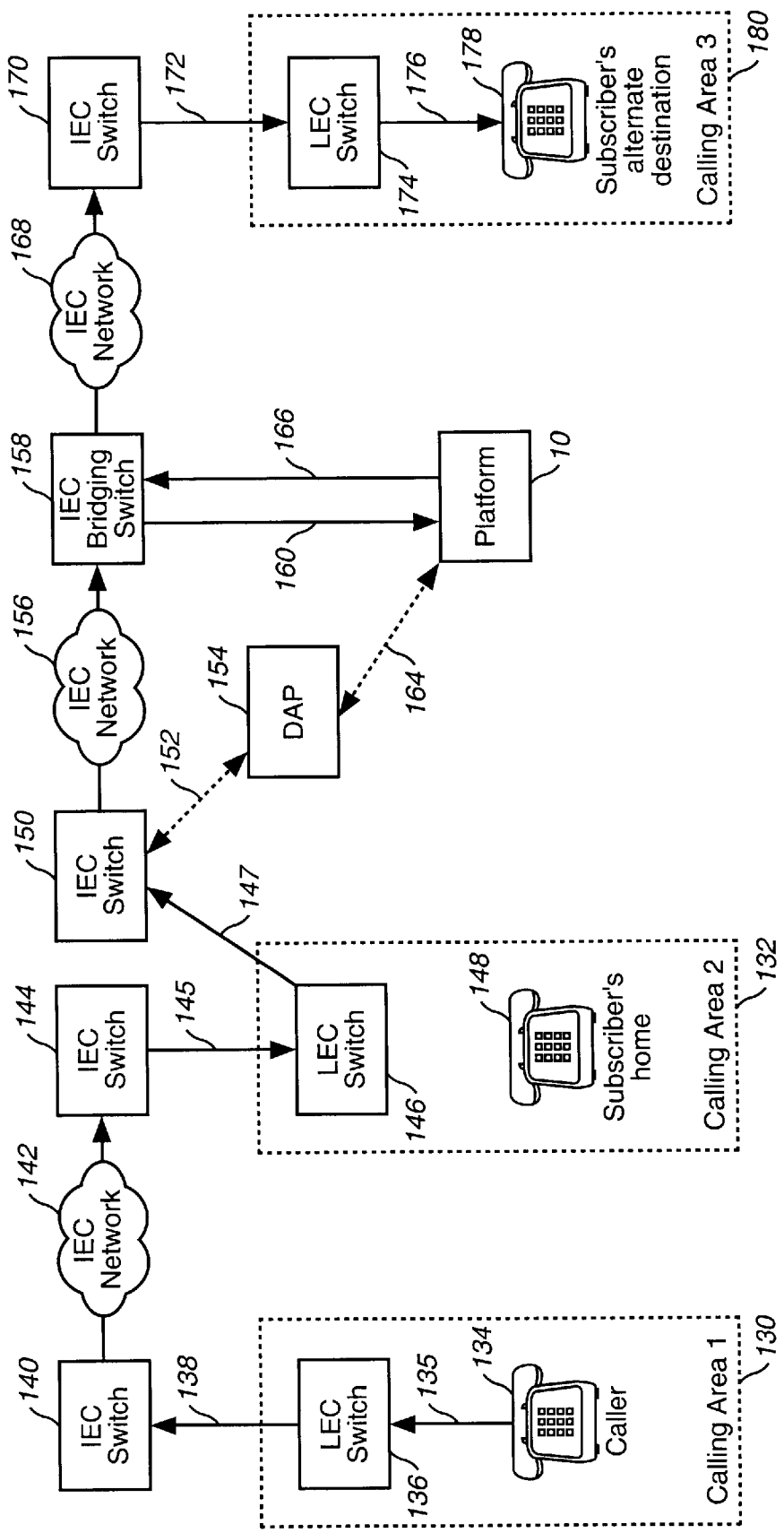
FIG. 4 illustrates the call flow when a caller dials a long distance DDD number and the call is directed to a subscriber's alternate destination.

The IEC switch 140 routes the call over the IEC network 142 to an IEC switch 144; i.e., switch 144 routes the call to LEC switch 146 within calling area 132 as indicated by arrow 145 in FIG. 4 (step 108 in FIG. 3). The LEC switch 146 performs a standard switch table query to yield a number translation (step 110 in FIG. 3). In particular, the originally dialed DDD phone number is translated to a second DDD phone number that is unique to the subscriber. The LEC switch 146 then uses this second DDD number to route the call to an IEC switch 150 along with a special carrier identification code (CIC) generated by the LEC switch 146 that designates the call as a call that is destined to the platform 10 (step 112 in FIG. 3; see arrow 147 in FIG. 4).

The IEC switch 150 receives the call and issues a query to the data access point (DAP) 154 as indicated by arrow 152 (step 114 in FIG. 3). The DAP 154 is a computer hardware/software platform that performs dialed number translations and provides enhanced call routing functions. The IEC switch 150 sends a query message based on the special CIC code that was forwarded from the LEC switch 146. The DAP 154 returns a translation to the IEC switch 150 (step 116 in FIG. 3). Specifically, the DAP 154 translates the second DDD number that was provided from the IEC switch 150 to a physical network address for the platform 10.

The IEC switch 150 uses the translation that is provided by the DAP 154 to redirect the call over IEC network 156 to an IEC bridging switch 158 (step 120 in FIG. 3). The IEC switch 150 may forward the originally dialed number in an initial address message (IAM) that is forwarded with the call to the IEC bridging switch 158. The IEC switch 150 also creates a CDR for the call to hold billing information for the call. The CDR is passed to the IEC bridging switch 158. As will be described in more detail below, the CDR will be marked as unbillable and dropped in downstream billing (step 118 in FIG. 3).

The IEC bridging switch 158 routes the call to the platform as indicated by arrow 160 in FIG. 4. The IEC bridging switch also creates an operator service record that is similar to a CDR and replaces the CDR for calls that are routed to the platform 10. The OSR is routed with the call to the platform 10 (step 122 in FIG. 3). The OSR is merged into a single billing record with a billing detail record that is created by the platform 10.

The platform 10 receives the call and information and services the call (step 124 in FIG. 3). As was described above, the platform 10 may service the call in a number of different fashions.

Figure 5:
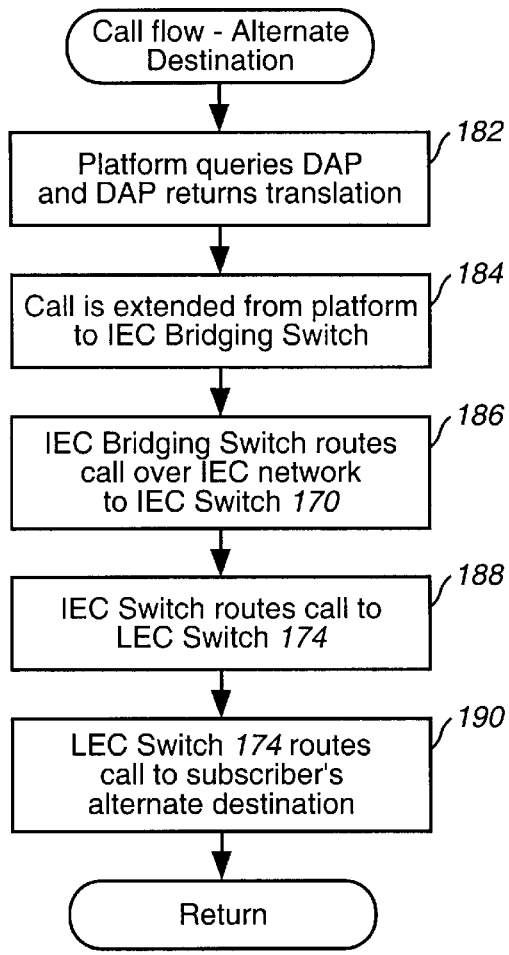
FIG. 5 is a flowchart that illustrates the steps that are performed for the call flow depicted in FIG. 4.

FIG. 5 is a flowchart that illustrates the steps that are performed in the instance where the platform 10 redirects the call to a subscriber's alternate destination. In such an instance, the platform 10 queries the DAP 154 in instances where the call is to a VPN, a special area code or other number that requires routing translation. The DAP returns the translation as indicated by arrow 164 in FIG. 4 (step 182 in FIG. 5). The platform 10 is accessed to a subscriber profile that identifies the alternate destination to which the call should be routed. A query to the DAP 154 provides this routing information and thus, the call may be extended from the platform 10 to an IEC bridging switch 158 as indicated by arrow 166 in FIG. 4 (step 184 in FIG. 5). The IEC bridging switch 158 receives the extended call and routes the call over the IEC network 168 to an IEC switch 170 (step 186 in FIG. 5). The IEC switch 170 routes the call to an LEC switch 174 within the calling area 180 that holds the subscriber's alternate destination 178 as indicated by arrow 172 in FIG. 4 (step 188 in FIG. 5). The LEC switch 174 then routes the call to the subscriber's alternate destination 178 as indicated by arrow 176 in FIG. 4 (step 190 in FIG. 5).

Figure 6:
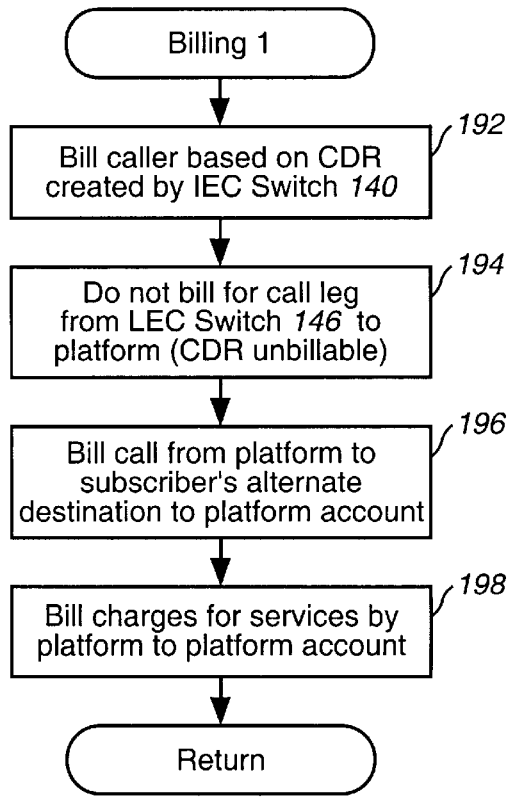
FIG. 6 is a flowchart illustrating the steps that are performed to realize billing for the call flow of FIG. 4.

In order to better appreciate how billing is performed in the exemplary embodiment of the present invention, it is helpful to consider how the call depicted in FIG. 4 is billed. FIG. 6 is a flowchart that illustrates the steps that are performed to realize the billing for the call of FIG. 4. It should be appreciated that these steps need not be performed in the sequence depicted in FIG. 6. The caller 134 is billed based upon the CDR that is created by IEC switch 140 for a long distance call that is placed from the caller in calling area 130 to the subscriber's home location 148 in calling area 132 (step 192 in FIG. 6). A portion of the call leg from the LEC switch 146 to the platform 10 is not billed (step 194 in FIG. 6). In particular, the CDR that is created by the IEC switch 150 is marked as unbillable based upon the special CIC generated by LEC switch 146 or based upon the platform destination that is identified by the translated DDD number. The call that is extended from the platform 10 to the subscriber's alternate destination 178 is billed to the subscriber's platform account (step 196 in FIG. 6). This extended call is based on standard long distance rates from calling area 132 to calling area 180. If the extended call is a VPN call, the call is billed at VPN rates. Any additional charges for paging, facsimile, voice mail or routing services performed by the platform 10 are also assessed to the subscriber's platform account (step 198 in FIG. 6).

Figure 7:
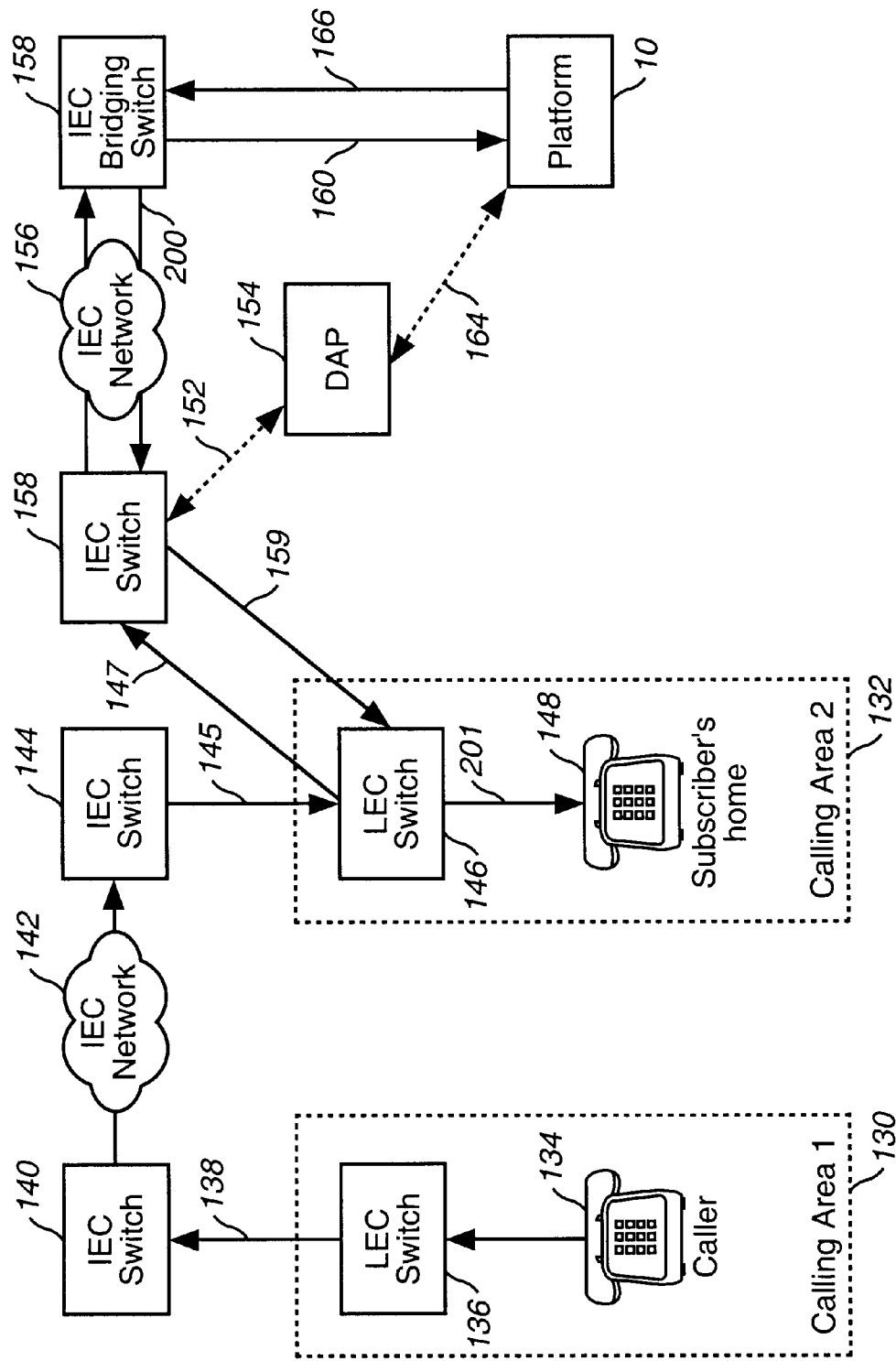
FIG. 7 illustrates the call flow when a caller dials a long distance DDD number and the call is directed by the platform to the subscriber's home.
Figure 8:
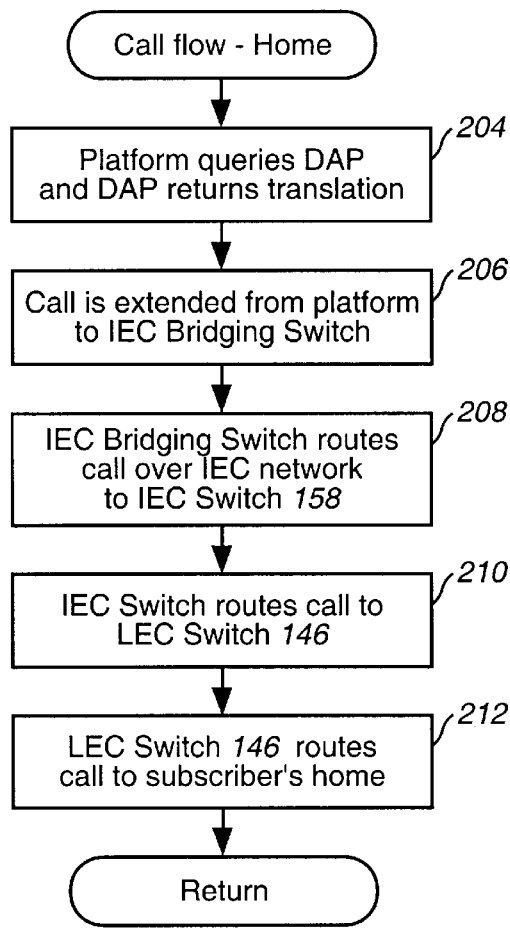
FIG. 8 is a flowchart illustrating the steps that are performed to realize the call flow depicted in FIG. 7.

FIG. 7 shows an example where the call is not routed to the subscriber's alternate destination but rather is routed by the platform back to the subscriber's home location 148. FIG. 8 is a flowchart illustrating the steps that are performed to direct the call to the subscriber's home location 148 after the call has reached the platform 10. The platform 10 queries the DAP 154 as needed and, in such instances, the DAP 154 returns a translation to the platform (step 204 in FIG. 8). The call is extended by the platform 10 to the IEC bridging switch 158 as indicated by arrow 166 in FIG. 7 (step 206 in FIG. 8). The IEC bridging switch 158 routes the call over the IEC network 156 to the IEC switch 158 as indicated by arrow 200 in FIG. 7 (step 208 in FIG. 8). The IEC switch 158 routes the call to the LEC switch 146 within the subscriber's LEC as indicated by arrow 159 in FIG. 7 (step 210 in FIG. 8). The LEC switch 146 then routes the call to the subscriber's home 148 as indicated by arrow 201 in FIG. 7 (step 212 in FIG. 8).

Figure 9:
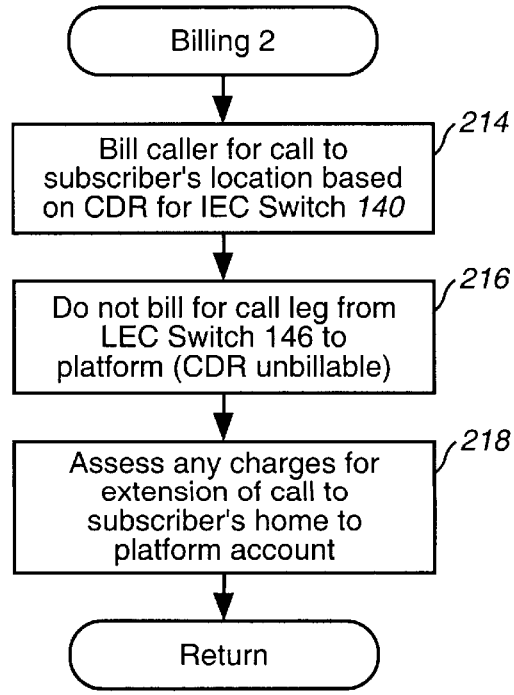
FIG. 9 is a flowchart illustrating how billing is realized in the call flow of FIG. 7.

FIG. 9 is a flowchart that illustrates the steps that are performed to complete billing when the call flow is like that depicted in FIG. 7. The caller is billed for a long distance call to the subscriber's home location 148 based upon the CDR that is created by IEC switch 140 (step 214 in FIG. 9). Once again, the call leg that extends from the LEC switch 146 to the platform 10 is not billed. The CDR created by IEC switch 158 is marked as unbillable (step 216 in FIG. 9). Any charges that are accrued for extension of a call from the platform 10 to the subscriber's home location 148 are assessed to the subscriber's platform account (step 218 in FIG. 9). Such charges become part of the BDR created by the platform 10.

Figure 10:
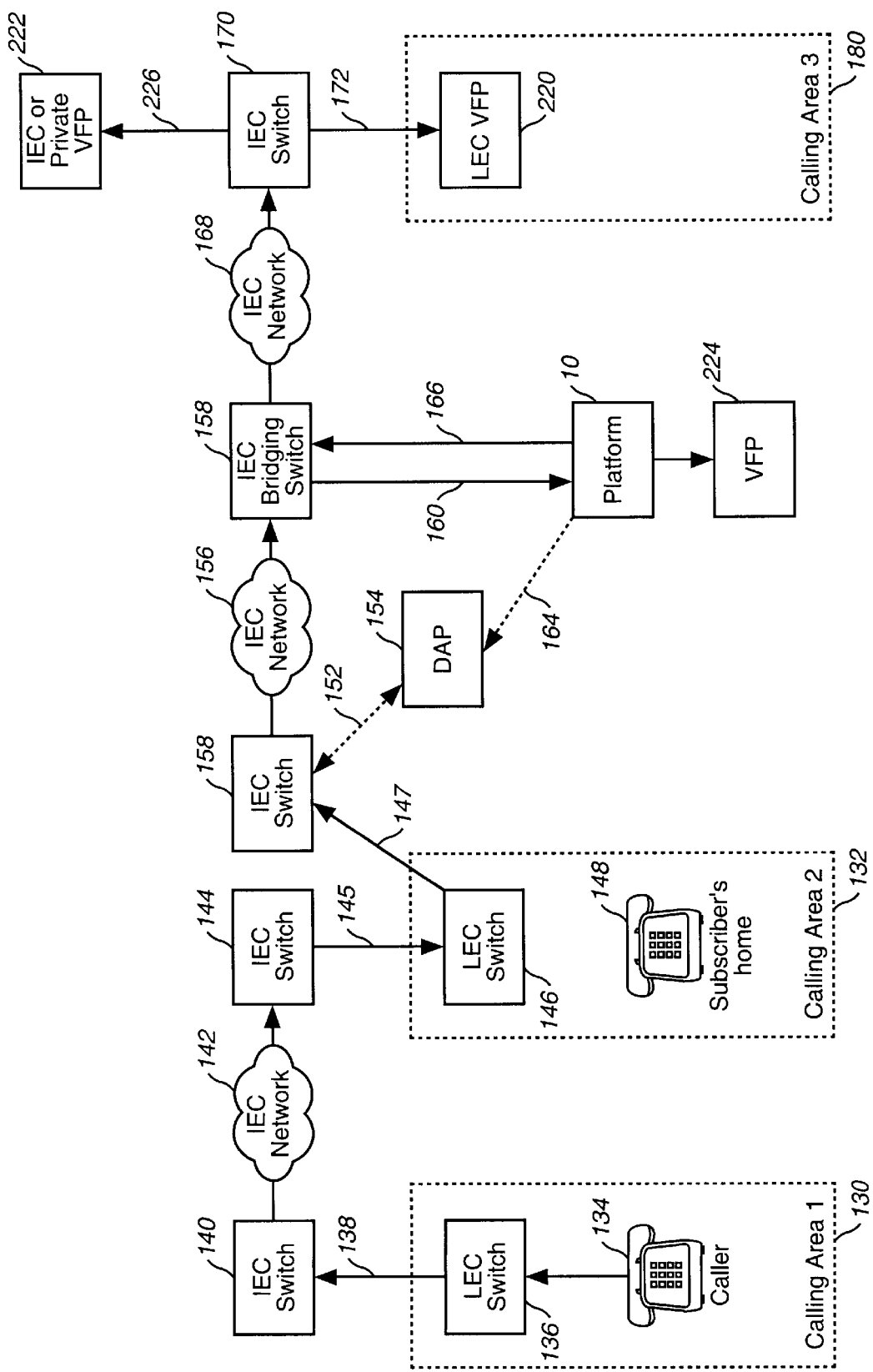
FIG. 10 illustrates a call flow when a caller dials a long distance DDD number that is directed to a voicemail/faxmail platform (VFP).
Figure 11:
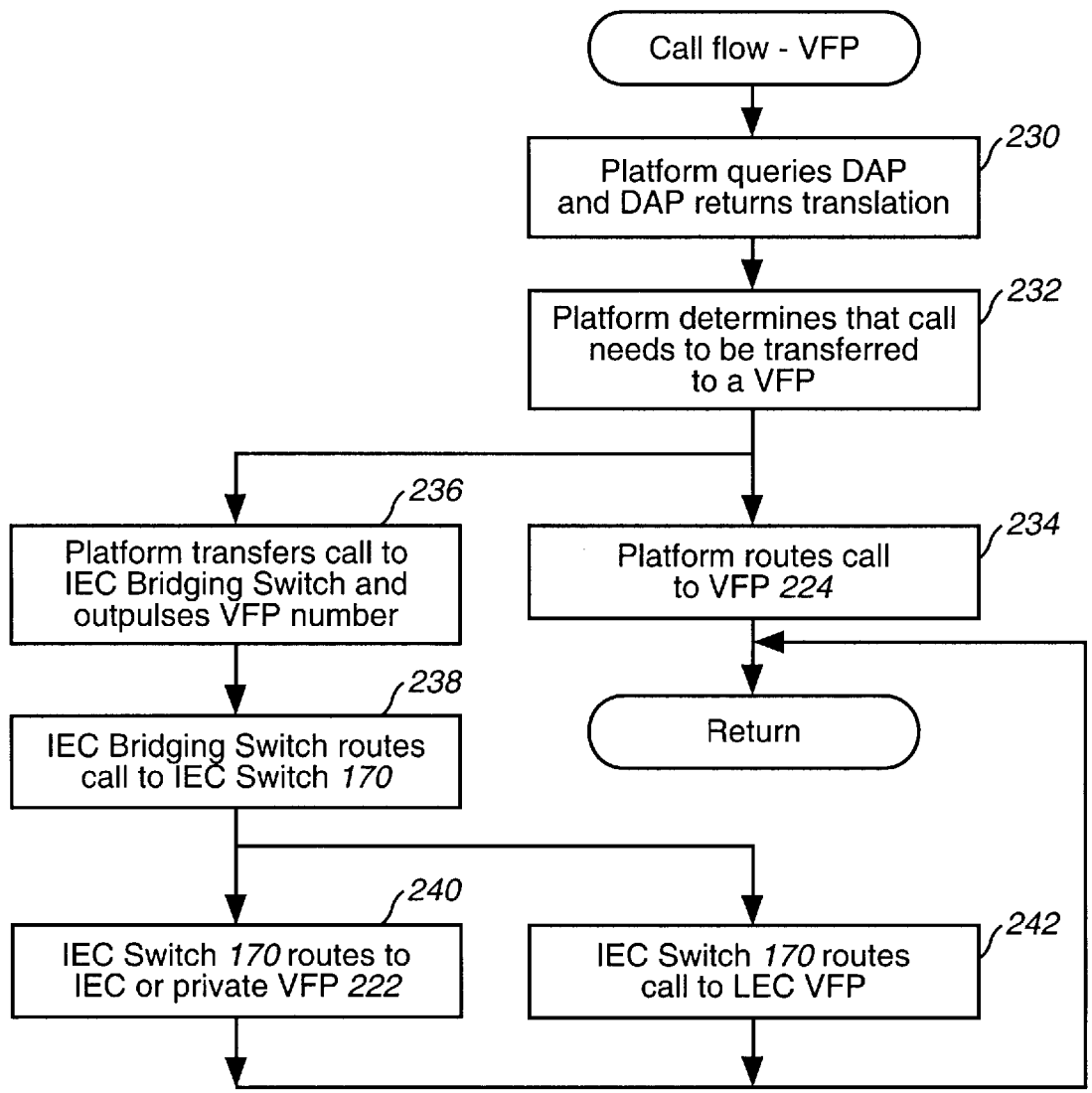
FIG. 11 is a flowchart illustrating the steps that are performed to realize the call flow depicted in FIG. 10.

The platform 10 may also direct the call to a voicemail/faxmail platform (VFP) so that the caller 134 may leave a voicemail message or a facsimile message for the subscriber. FIG. 10 depicts an instance wherein the call is directed to one of multiple VFPs 220, 222 or 224. It should be appreciated, that the caller may be the subscriber. The VFP is described in more detail in the copending application entitled "SINGLE TELEPHONE NUMBER ACCESS TO MULTIPLE COMMUNICATIONS SERVICES," which was referenced above. FIG. 11 is a flowchart that illustrates the steps that are performed by the exemplary embodiment of the present invention after the call has reached the platform 10 to direct the call to one of the VFPs 220, 222 or 224. Additionally, the platform 10 may query the DAP 154 as needed so that the DAP returns a translation that the platform may utilize (step 230 in FIG. 11). The platform 10 determines that the call needs to be transferred to one of the VFPs (step 232 in FIG. 11).

The steps that are next performed depend upon which VFP 220, 222 or 224 is to receive the call. If the call is to be routed to VFP 224, the platform 10 simply routes the call to VFP 224 that has a direct connection with the platform 10 (step 234 in FIG. 11). In contrast, if the call is to be routed to VFP 220 or VFP 222, the platform 10 must extend the call by attaching the call to IEC bridging switch 158 indicated by arrow 166 in FIG. 10 (step 236 in FIG. 11). The platform 10 outpulses the telephone number for the VFP 220 or 222 for the IEC bridging switch 158. The IEC bridging switch 158 then routes the call over the IEC network 168 to IEC switch 170 (step 238 in FIG. 11). If the call is to be routed to an IEC VFP or a private VFP 222, the IEC switch 170 routes the call to the IEC or private VFP 222 as indicated by arrow 226 in FIG. 10 (step 240 in FIG. 11). On the other hand, if the call is to be routed to an LEC VFP 220, the IEC switch 170 routes the call as indicated by arrow 172 in FIG. 10 to the LEC VFP 220 within calling area 180 (step 242 in FIG. 11).

Figure 12:
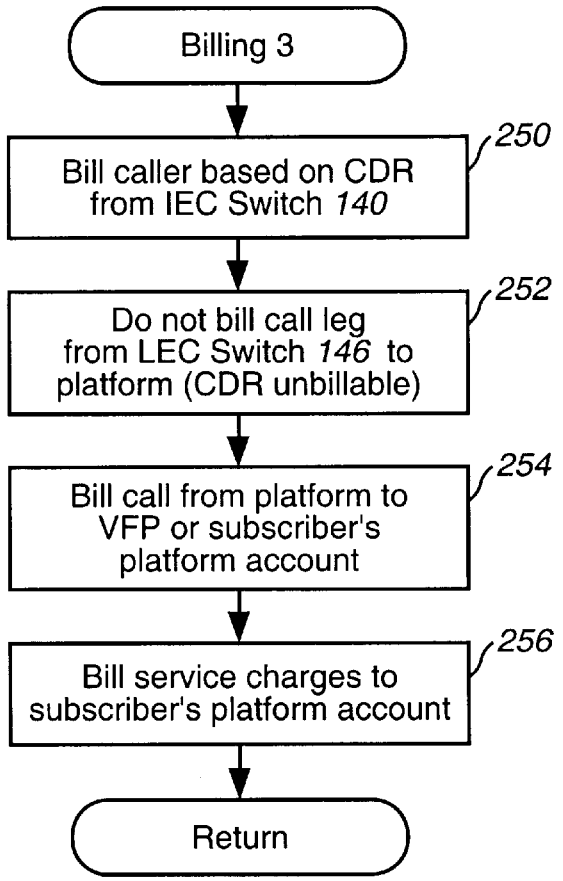
FIG. 12 is a flowchart illustrating the steps that are performed to bill a call for the call flow depicted in FIG. 10.

FIG. 12 indicates how billing is performed when the call flow follows one of the scenarios depicted in FIG. 10. The caller is billed for a call from calling area 130 to calling area 132 based upon the CDR that is created by IEC switch 140 (step 250 in FIG. 12). The call leg from the LEC switch 146 to the platform is not billed (step 252 in FIG. 12). The call, if any, from the platform 10 to the VFP is charged to the subscriber's platform account (step 254 in FIG. 12). Any services provided by the VFP and the platform 10 are charged to the subscriber's platform account (step 256 in FIG. 12). The VFPs 220, 222 or 224 are capable of creating a BDR for the services that are provided and the charges associated with this BDR are incorporated into a same invoice as the charges created by the platform BDR.

Figure 14:
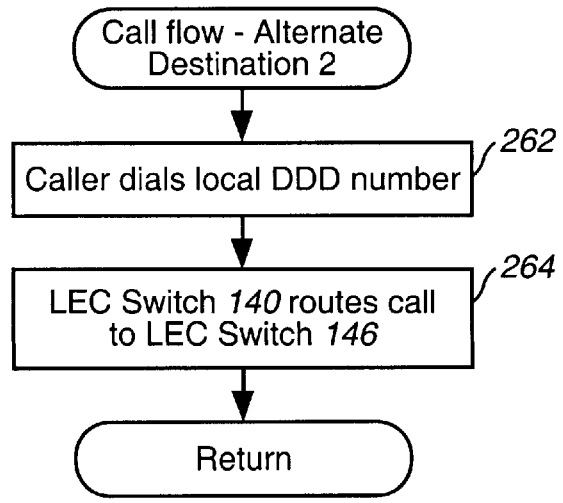
FIG. 14 is a flowchart illustrating the steps that differ from those depicted in FIG. 3 for the call flow of FIG. 13.
Figure 13:
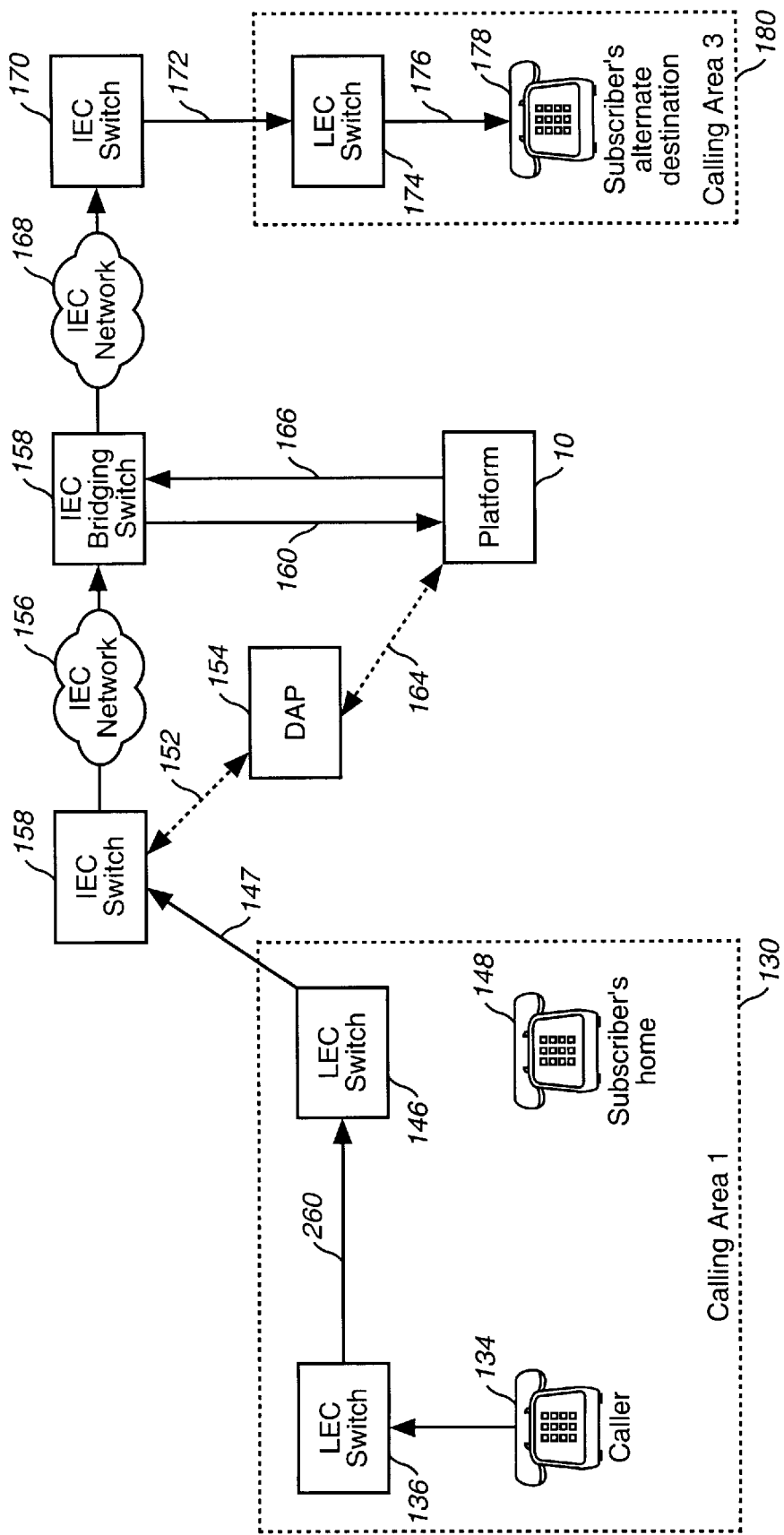
FIG. 13 illustrates the call flow when a caller dials a local DDD number and the platform redirects the call to a subscriber's alternate destination.

The above examples have includes instances wherein the caller 134 initiates a long distance DDD call rather than a local DDD call. FIG. 13 depicts the call flow for an example wherein the caller 134 dials a local DDD number to attempt to reach the subscriber but the platform 10 redirects the call to the subscriber's alternate destination 178 within another calling area 180. The call flow differs from that depicted in FIG. 3 with respect to the steps shown in FIG. 14. Specifically, instead of step 100 in FIG. 3, the caller 134 dials a local DDD number (step 262 in FIG. 14) that lies within the same calling area 130 as the subscriber's home 148. The LEC switch 136, instead of routing the call to IEC switch 140, routes the call to LEC switch 146 as indicated by arrow 260 in FIG. 13 (step 264 in FIG. 14). The call flow then continues at step 110 of FIG. 3. In such an example, the caller is billed in a fashion like that depicted in FIG. 6 except that the caller is not billed for a long distance call as in step 192 in FIG. 6.

Figure 15:
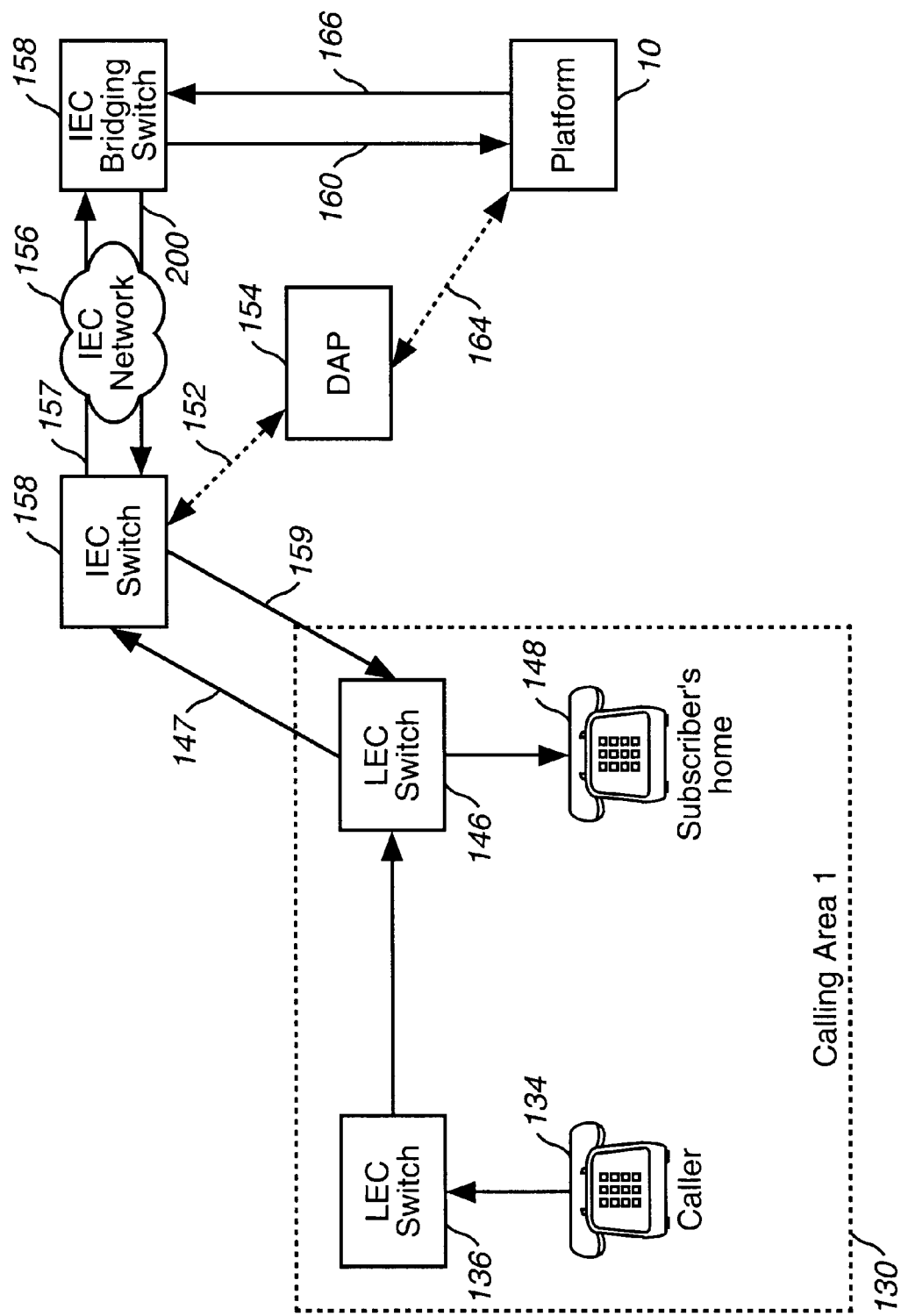
FIG. 15 depicts the call flow when a caller dials a local DDD number and the platform directs the call to a subscriber's home location.

FIG. 15 depicts an example of the call flow in which the call is initiated by dialing a local DDD number to access the subscriber of the subscriber's home 148, where the subscriber's home lies within the same calling area as the caller 134. The call flow is largely like that depicted in FIG. 7 except that the LEC switch 136 directs the call to LEC switch 146 rather than IEC switch 140. The billing is like that depicted in FIG. 9 except that the caller is not billed for the call from the subscriber's location based upon a CDR or IEC switch 140 (see step 214 in FIG. 9).

While the present invention has been described with a preferred embodiment thereof, those skilled in the art will appreciate that various changes in form and detail may be made without departing from the intended scope of the present invention as defined in the appended claims.

We claim:

1. In a telecommunications network for routing calls to a platform that provides multiple communications services on behalf of a subscriber, a method comprising the steps of:

receiving it a local exchange carrier (LEC) switch, a call flow a caller that was initiated as a direct distance dialing (DDD) call by dialing a first DDD number;

translating, at the LEC switch, the first DDD number to a second DDD number;

routing the call from the LEC switch to an inter-exchange carrier(IEC) switch using the second DDD number and a special carrier identification code (CIC) generated by the LEC switch, the special CIC designating the call as one destined to a communications services platform;

sending a query message from the IEC switch to a data access point (DAP) based on the special CIC and the second DDD number;

receiving from the DAP at the IEC switch a translation of the second DDD number to a physical network address for the communications services platform; and using said physical network address to redirect the call from the IEC switch to the communication services platform via an IEC network and an IEC bridging switch.

2. The method of claim 1 wherein the network includes a server holding a database of routing information, the IEC switch through which the call is routed accessing the database to obtain a network address for the platform for use in routing the call to the platform.

3. The method of claim 1 wherein said initiated call has a value unique to the subscriber.

* * * * *